March 15, 1932.   L. B. BRIDGES   1,849,066
TIGHT HOLDING COUPLING
Filed July 3, 1929   2 Sheets-Sheet 1
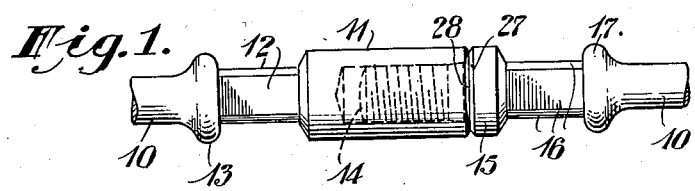
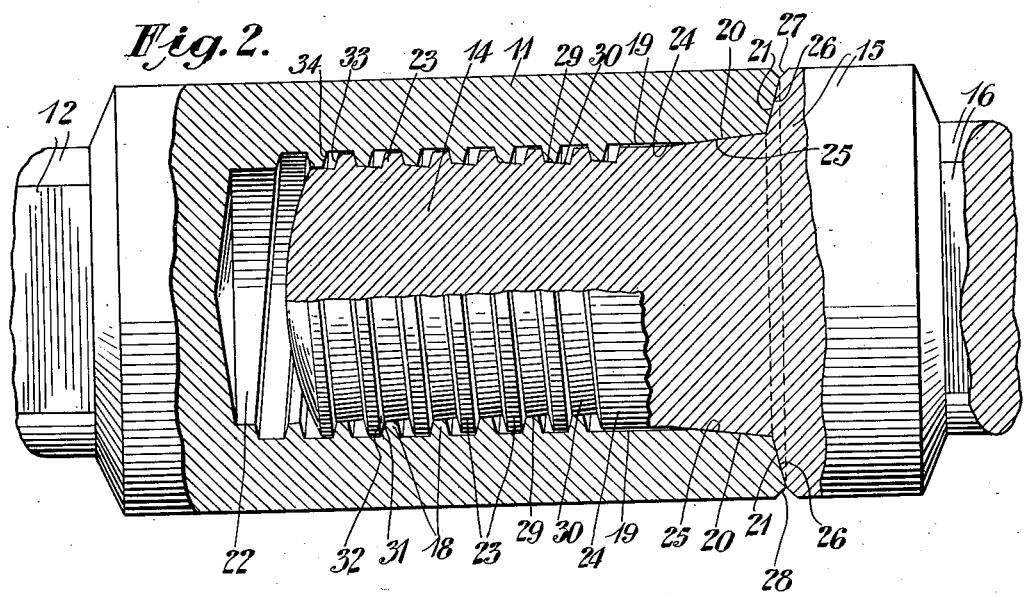
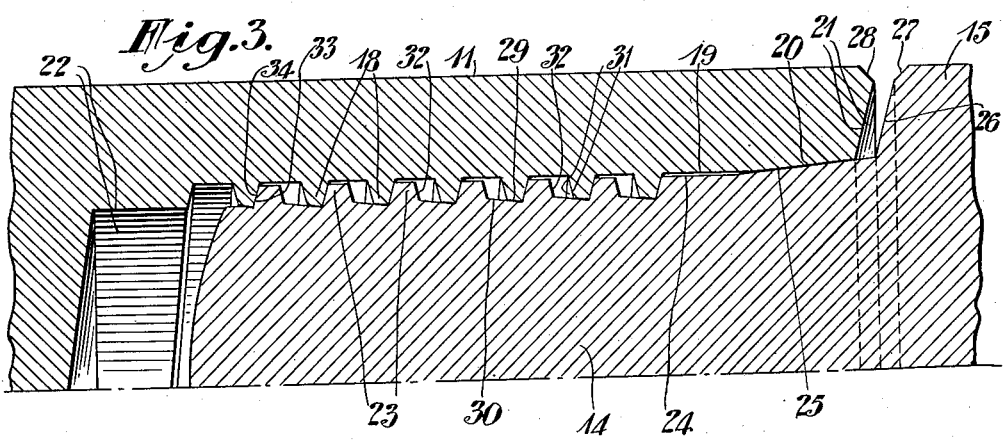
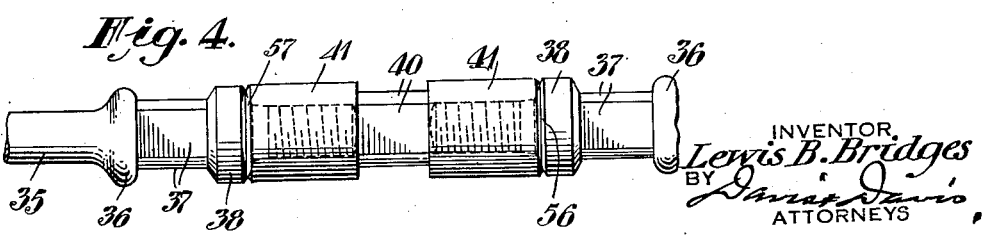
INVENTOR.
Lewis B. Bridges
BY
ATTORNEYS

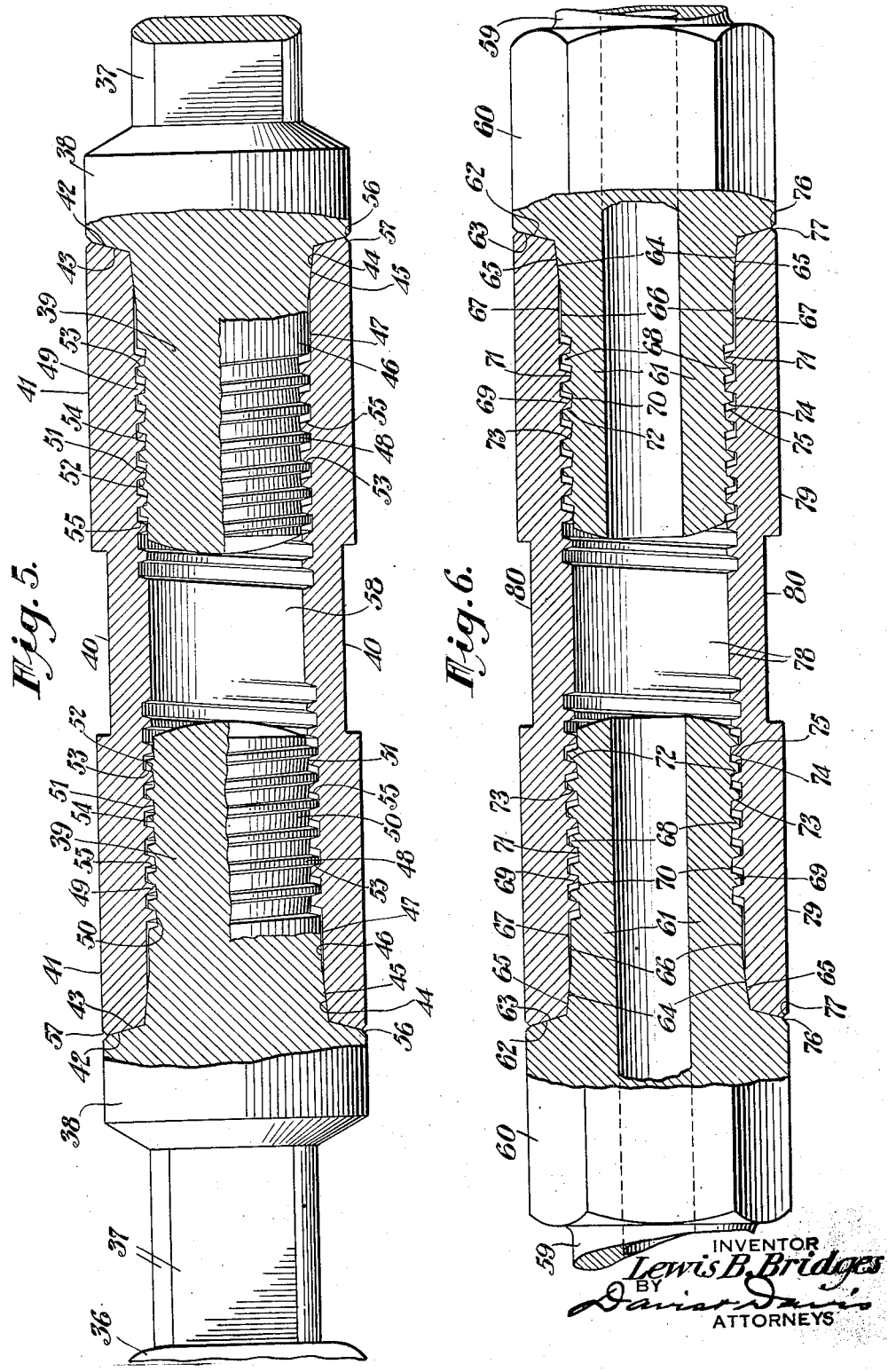

Patented Mar. 15, 1932

1,849,066

UNITED STATES PATENT OFFICE

LEWIS B. BRIDGES, OF BROOKLYN, NEW YORK, ASSIGNOR TO DARDELET THREADLOCK CORPORATION, OF NEW YORK, N. Y., A CORPORATION OF DELAWARE

TIGHT HOLDING COUPLING

Application filed July 3, 1929. Serial No. 375,601.

This invention relates to improvements in tight-holding separable couplings for rods, pipes and other members or parts, and has for its general object to provide a highly efficient and secure jointure for members in situations wherein it is desirable that they may be readily separated at will.

The invention is especially applicable for use in securely holding parts subject to severe vibrations, and lateral and axial strains, such as sectional sucker rods for oil well pumps and reciprocating machine parts, and for use in securely holding parts, such as parts of a pipe line, where a fluid tight joint is required, and included among the objects of the invention are the providing of means for effectively accomplishing these ends in a simple manner.

The invention further contemplates providing a construction wherein two members or parts may be readily united, by screwing the same together, in such manner that they are self held against accidental unscrewing and against play therebetween in any direction in the joint, and that the joint will be well adapted to withstand great lateral, tension and compression strains for long periods without developing sufficient fatigue of the metal of the parts where they are interfitted to cause breakage in the joint.

A further specific object of the invention is to provide a screw joint wherein the jointed parts are frictionally locked against unscrewing by two pairs of coactive conoidal locking surface portions jammed together under elastic stress, the two surfaces of one pair sloping in one direction longitudinally of the joint and the two surfaces of the other pair sloping in the opposite direction longitudinally of the joint and all making a similar angle with the axial line of the joint which angle is within the angle of friction of the surfaces, and the parts are positively held against direct relative axial movement in both directions, with the locking surface portions in jammed relation, by coactive pairs of abutment surface portions disposed abruptly to the axial line of the joint which serve also to limit positively the screwing together of the parts.

The invention is of wide application in industry, as will be obvious to skilled persons, and the constructions shown in the accompanying drawings, and hereinafter described, are merely illustrations of its preferred embodiment in certain typical forms of jointed members sufficient to afford a full understanding of the invention and its advantages.

In the drawings:

Fig. 1 is a fragmentary view of a sucker rod for oil well pumps of the type in which each unit consists of a rod section provided with a box at one end and a pin at the opposite end;

Fig. 2 a view partly in longitudinal section, and on an enlarged scale, of the rod shown in Fig. 1, the units being shown in locked relation as in Fig. 1;

Fig. 3 a view similar to Fig. 2, showing the relation of the units, during coupling, just prior to the locking displacement of the threads and of the unthreaded cones;

Fig. 4 a fragmentary view of a sucker rod for oil well pumps of the type in which the rod consists of alternate rod and coupling sleeve units, each rod unit having a pin at each end and each coupling sleeve unit having a box at each end;

Fig. 5 a view partly in longitudinal section, and on an enlarged scale, of the rod shown in Fig. 4, the units being shown in locked relation as in Fig. 4; and Fig. 6 a view similar to Fig. 5 showing the invention embodied in a pipe line wherein two pipe units are united by a coupling sleeve or union unit.

The construction of sucker rods for oil well pumps shown in Figs. 1, 2, and 3 will first be described. This jointed rod consists of a plurality of identical metallic rod units directly connected with each other. The usual lengths of these rod units are from 25 to 30 feet and the usual diameters of the main cylindrical body portions of the rod units are from 5/8 to 3/4 inches. The total length of a jointed rod varies with the depth of the well from a few hundred feet to seven thousand feet, or more, the rod being built up to the desired length by adding sections successively to the upper end of a rod depending in a well.

The end portions of the rod unit blanks are enlarged ordinarily to a diameter of from 1⅓ to 1⅛ inches, the enlarged portion at the upper end of each rod unit being reduced to form a pin externally threaded with a U. S. standard thread extending along a cylindrical and a tapered portion of the pin, and said enlarged portion is reduced intermediate the base of the pin and the upper end of the main body of the rod unit to non-circular form to afford a wrench receiving portion lying between two integral collars. The enlarged portion at the lower end of each rod unit is bored and internally threaded to afford a box or socket to receive the pin of the next lower rod unit and is also reduced above the upper end of the box to non-circular form to afford a wrench-receiving portion between the upper end of the box and an integral collar on the rod unit. When screwed together, an end surface on the mouth of the box abuts a side face of the collar at the base of the pin, these abutting surfaces being perpendicular to the axis of the rod.

In use, rod units so joined, at times become accidentally unscrewed or break transversely at the joint. They are also relatively weak in tension within the threaded joint, all these defects resulting from end and lateral play in the screw joint and the fact that the joint does not offer sufficient frictional resistance to relative turning between rod units in unscrewing direction. Attempts to overcome these disadvantages have resulted in more or less complicated constructions usually involving employing additional parts and weakening of the rod at the junction point. The present invention affords a simple construction for attaining the desired ends by improved constructions of the engaging portions of the rod units.

The main cylindrical body portion of each rod unit is designated 10, the box at the lower end of the rod unit is designated 11, the wrench receiving portion above the box is designated 12, and the integral collar above portion 12 is designated 13. The pin at the upper end of each rod section is designated 14, the integral collar at the base of the pin is designated 15, the wrench receiving portion adjacent the upper end of the rod section is designated 16, and the integral collar below portion 16 is designated 17. As so far described the parts are of the ordinary construction heretofore referred to, and the improved features of construction will now be described.

From its closed end to a point short of its open end the box 11 has a cylindrical bore 22 in the surface of which is formed an internal or female screw thread 18. At the outer end of thread 18 the box has a cylindrical counterbore 19 corresponding in diameter with the root diameter of thread 18, and from the outer end of counterbore 19 to the open end of the box said box has a conical counterbore 20 flaring radially outward from the outer end of bore 19. The annular end edge of the box, at the mouth of the box, is machined to afford an annular abutment face or shoulder 21 sloping inwardly at an angle to the axis of the box greater than the angle of friction of the rod metal, preferably at an angle of 14½ degrees with a perpendicular to the rod axis, and relatively wide, as shown.

Pin 14 is somewhat shorter than the bore or socket of the box, and from its upper end to a point short of its base the pin is cylindrical, said cylindrical portion having an external or male screw thread 23 thereon. At the inner or lower end of thread 23 the pin is formed with a smooth unthreaded cylindrical portion 24 of slightly less diameter than counterbore 19 of the box and preferably of the same diameter as the crest diameter of thread 23, as shown. From surface 24 to the base of the pin, said pin has a conical surface portion 25 flaring outwardly from surface 24 to the base of the pin, and having the same slope as surface 20 of the box.

Surface 19 is wider than surface 24, while surface 20 is narrower than surface 25. Cone surfaces 20 and 25 are correlated to match in the Fig. 3 position and for stretching of 20 upon 25 without exceeding the elastic limit of the rod metal during displacement of said surfaces across each other from the Fig. 3 to the Fig. 2 position while in contact. At the base of the pin, collar 15 is formed by machining with an annular side abutment face or shoulder 26 having the same slope relatively to the axis of the rod as abutment face 21 of the box and registering with face 21 when the parts are engaged. Collar 15 and box 21 are preferably slightly chamfered as shown at 27 and 28 respectively.

Threads 18 and 23 are of equal and constant pitch, the thread ribs are materially narrower than the thread grooves to permit of a substantial axial or crosswise displacement between the engaged threads, and the crest surface 29 of thread 18 and root surface 30 of thread 23 have a slope relatively to the axis of the rod crosswise of the said surfaces in a direction opposite to that of cone surfaces 20 and 25 of the box and pin. This slope of said thread surfaces is within the angle of friction of the rod metal and preferably is the same as that of surfaces 20 and 25, said slope for all these conoidal locking surfaces being preferably at an angle of 6 degrees with the rod axis as shown. The helicoidal locking surface portions 29 and 30 of the threads are correlated for free turning in the Fig. 3 position and for displacement while in contact from the Fig. 3 to the Fig. 2 position to stretch the surface 29 on surface 30 within the elastic limit of the rod metal.

The operation is believed to be obvious but may be briefly stated as follows:

With one rod unit held pin end uppermost at the upper end of the well, the next rod section may be added by freely rotating it clockwise, box end down, to screw its box on the pin at the pitch rate of threads 18 and 23 until the parts assume the Fig. 3 position. This may be easily and quickly done by hand without a wrench since the threads do not tightly match during such screwing, whereas in present constructions closely matched threads are employed, in an effort to secure a tight joint, which require wrench leverage throughout the joining screwing. In the Fig. 3 position the screwing advance of the box down the pin is interrupted by the mating of cones 20 and 25.

With the lower unit held by a wrench on portion 16, further forcible clockwise turning of the upper unit by a wrench applied to portion 12 causes a relative crosswise or axial displacement between the threads carrying surface 29 across surface 30 in locking direction until this displacement is positively arrested by the engagement of abutment surface 31 of thread 18 under abutment surface 32 of thread 23. While the threads are now frictionally locked against accidental unscrewing, forcible screwing with a wrench is possible, so the box may now be further advanced down the pin at the pitch rate of the threads under the reaction of helicoidal abutment surfaces 31 and 32 to fully jam cone 20 across cone 25, to stretch the cone surfaces into self-locking frictional engagement, until abutment surfaces 21 and 26 engage.

Thereafter further turning in screwing direction is impossible and the units are very securely frictionally locked against unscrewing while abutments 31 and 32 and abutments 21 and 26 positively prevent direct end play, and the two sets of reversely sloped conoidal locking surfaces center and positively prevent lateral play or side shake. It will be observed that the arrangement of threads 18 and 23 with cone surfaces 20—25, cylindrical surfaces 19—24 and abutment surfaces 21—26 gives augmented locking, side shake preventing, and end play preventing effects, somewhat as if two sets of threads of the kind shown were simultaneously displaced in opposite directions into self-holding relation by screwing together the two rod units.

The unlocking displacement of the threads is positively limited by helicoidal abutment surface portions 33 and 34. The several abutment surface portions of the threads make an angle with the axial line of the rod greater than the angle of friction, preferably making the same 14½ degree angles with the perpendicular to said axis as the abutment surfaces 21 and 26. The extent of relative crosswise or axial displacement while in contact between cone surfaces 20 and 25 in preferably the same as that between thread surfaces 29 and 30, as shown in Figs. 2 and 3, so that the jamming of the cones into locked relation will not affect the locking grip of the threads and that the box will be uniformly radially stretched when the rod units are locked together.

The abrupt 14½ degree slope of the sides of the thread ribs afford coactive abutments of a kind affording greater strength in resisting tension strains on the rod in use than the standard 60 degree thread face slope while the cone surfaces 20—25 and 29—30 make the joint securely self-holding against accidental unscrewing. The standard 60° side face thread, as is well known, does not afford a secure grip against unscrewing. The several cone surfaces and oppositely sloping sets of said surfaces also effectively center the pin and box and absolutely prevent lateral play or "side shake" in the joint, the most fruitful source of the unscrewing tendency, and of the breakage of pins and boxes due to fatigue of the metal, in present constructions.

Lateral strains are also widely distributed throughout the joint, thus minimizing liability of fracture. The thread for a given size is relatively shallow as compared with other threads usable in rod joints, thus increasing the core diameter and the strength, and the roots of the thread are broad and relatively flat so that strains are not concentrated along the apex of a deep and narrow V-shaped groove, thus further contributing to the strength of the joint.

The construction shown in Figs. 4 and 5 is the same as that shown in Figs. 1 to 3, except that the improvements are embodied in a sucker rod of the type consisting of alternate rod and sleeve or union units, and need be only briefly described. Each rod unit has the main body 35 at each end of which is a collar 36, a wrench receiving portion 37, a collar 38 and a pin 39. The metal union or coupling sleeve is in effect a duplex box member having an intermediate externally flatted wrench receiving portion 40 and two box portions or pin receiving end portions 41.

Referring particularly to Fig. 5, the parts and surfaces corresponding with similar parts and surfaces in the construction heretofore described are designated as follows: 42 and 43 are the coactive abutment surfaces on the collars and boxes, 44 and 45 the coactive cone surfaces, 46 and 47 the cylindrical surfaces, 48 and 49 the external and internal threads, 50 and 51 the locking surface portions of the threads, 52 and 53 the abutment surface portions of the threads which limit displacement in locking direction, 54 and 55 the abutment surface portions of the threads which limit thread displacement in unlocking direction, 56 and 57 the chamfers of the collars and boxes, and 58 the main bore of the duplex box.

It will be noted in Fig. 5 that the "hands" of the threads are such that in building up a rod each unit is screwed to the top of the next unit by turning each in the same direction, whether it be a sleeve unit or a solid rod unit. This arrangement is preferable to avoid accidental unscrewing in building up a long rod of many sections.

In Fig. 6 the improvements are shown embodied in a pipe line, the construction being substantially the same as that shown in Fig. 5 except that the two units joined by the sleeve or union unit are tubular or hollow pipe units instead of solid rod units. Each pipe unit has a main cylindrical body portion 59, two integral hexagonal wrench receiving collars 60 adjacent its opposite ends and two externally threaded nipples 61 at its opposite ends engaged in opposite ends of the union unit in precisely the same manner as the pins 39 are engaged in the ends of the union unit in the construction shown in Figs. 4 and 5 and above described. The union member or unit of the pipe line is of precisely the same construction as in Figs. 4 and 5, and the hands of the threads of the nipples and union are arranged in the same way as in said construction.

The portions and surfaces corresponding with similar portions and surfaces in the previously described constructions are designated as follows: 62 and 63 are the coactive abutment surfaces on the collars and union, 64 and 65 the coactive cone surfaces, 66 and 67 the cylindrical surfaces, 68 and 69 the external and internal threads, 70 and 71 the locking surfaces of the threads, 72 and 73 the abutment surfaces of the threads which limit thread displacement in locking direction, 74 and 75 the abutment surface of the threads limiting unlocking displacement thereof, 76 and 77 the chamfers of the collars and union, 78 the main bore of the union, 79 the nipple receiving end portions of the union, and 80 the flatted wrench receiving portion of the union.

The cone surfaces 64 and 65, in addition to the functions heretofore mentioned, also serve to afford a highly efficient fluid tight seal between the exterior of the pipe line and the threads preventing leakage from the line. This sealing feature is useful also in connection with the rod joints heretofore described since it seals the pins in the boxes keeping the threads clean and free from incrustation, thus protecting the vital holding elements of the joint from deterioration and contributing to ease of separation of the units after long use.

What I claim is:

1. A jointed rod, such as a sucker rod, comprising normally axially aligned units screwed together, wherein, at each joint, the two adjacent units are thread coupled by a pair of crosswisely displaceable threads having a pair of axially wedged conoidal crest and root surfaces and a pair of abutted thread sides, and have a pair of annular abutment surfaces engaged at the outer end of the internally threaded member, and are frictionally and telescopically coupled by a pair of wedged conoidal surfaces on non-threaded portions of the members located between said engaged abutment surfaces and the engaged screw threads, said two pairs of wedged conoidal surfaces holding the internally threaded member elastically stretched to the same extent, the conoidal crest and root surfaces tapering toward the rod axis in the direction of the abutments and the other pair of conoidal surfaces tapering in the opposite direction, and said abutted thread sides and said annular abutment surfaces being so steeply disposed to the rod axis as to prevent wedging of the thread sides on each other and wedging of the abutment surfaces on each other.

2. A jointed rod, as claimed in claim 1, wherein each two adjacent units contact each other and are held in assembled relation solely through the engagements between said pair of abutted thread sides, said two pairs of wedged conoidal surfaces and said pair of annular abutment surfaces, and wherein said two pairs of wedged conoidal surfaces make angles of the same amplitude with the rod axis, and the surfaces of each pair of said wedged conoidal surfaces are correlated to touch without deformation when the abutted thread sides and annular abutment surfaces are equally spaced apart.

3. In a separable joint for two members wherein one member has an externally conoidal non-threaded portion wedged in an internally conoidal non-threaded portion of a bore in the second member to hold said second member elastically expanded on said conoidal portion of the first member, means for holding the members so wedged together with the second member expanded a predetermined extent and for preventing accidental relative reciprocation between the members, comprising a pair of coupled and relatively crosswisely displaceable screw threads formed on non-tapered portions of said members and located within said bore at one end of said wedgeably engaged portions of the members, the external thread having a conoidal root of opposite taper to that of said wedged conoidal portions of the members, the threads being relatively crosswisely displaced into an abutting side face engagement in which the internal thread extends around the larger end of the conoidal root of the external thread, the crest of the internal thread being wedged on said larger end of said root to elastically expand the second member from end to end of the screw thread connection, the abutted side faces of the threads being non-wedgeable on each other, the members having endwisely abutted portions at one end of the joint non-wedgeable on each other, and said abutted non-wedgeable portions of the members and said abutted side faces of the threads being engageable at one and the same time only when the second member is expanded to the same extent by the wedged threads and the wedged conoidal non-threaded portions, whereby the efficiency of the thread connection is not affected by the wedging of the non-threaded conoidal portions.

4. A jointed rod comprising two axially aligned rod elements one end of one of which elements extends into an axial socket at the adjacent end of the second element, said elements being provided on non-tapered portions thereof with a pair of coupling screw threads screwed together within the socket, the screw thread connection terminating short of the outer end of the socket and the threads forming said connection being displaceable one crosswisely of the other between two fixed limits and provided with means for elastically expanding the socket uniformly from end to end of the thread connection a fixed extent when displaced to one limit of their relative crosswise movement, the outer end portion of the socket being non-threaded and the first rod element being provided with means coactive with said portion of the socket to uniformly expand the same as the rod elements are screwed together, and said rod elements being provided with coactive means for insuring full displacement of the threads in socket expanding direction and positively stopping screwing advance of the first element into said socket when said outer end portion of the socket is expanded by its coactive expanding means to the same extent to which said socket is expandible by said full displacement of said threads.

In testimony whereof I hereunto affix my signature.

LEWIS B. BRIDGES.